M. B. FRANK.
COMBINED ASH PAN AND SIFTER.
APPLICATION FILED APR. 8, 1916.
1,260,359.
Patented Mar. 26, 1918.
3 SHEETS—SHEET 2.
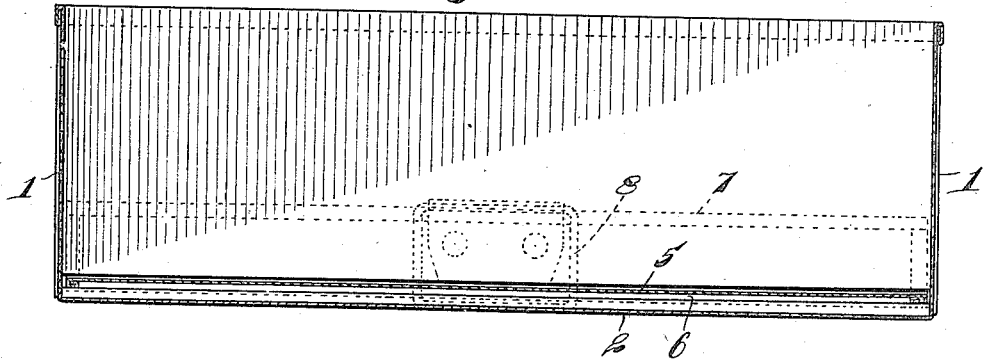
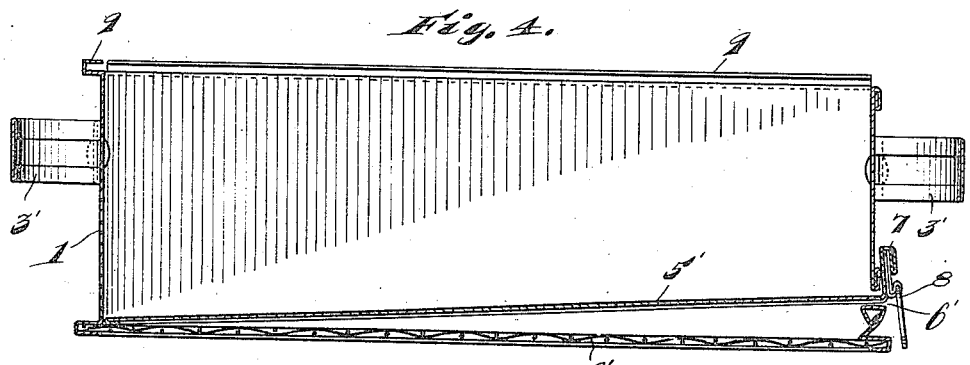
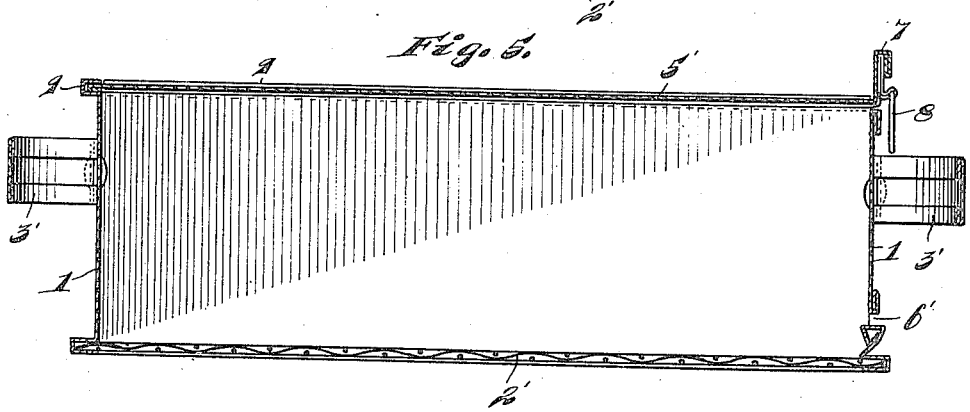

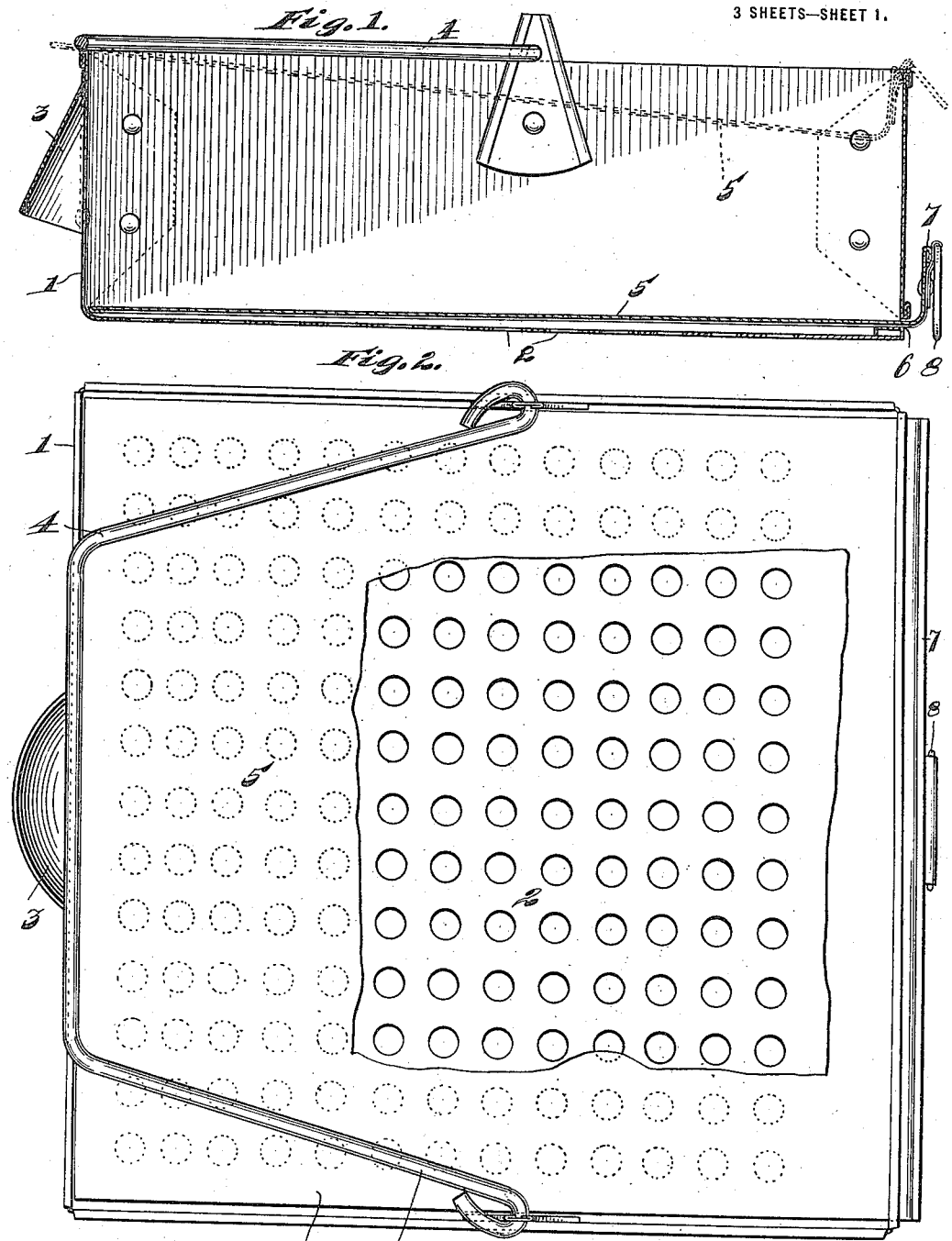

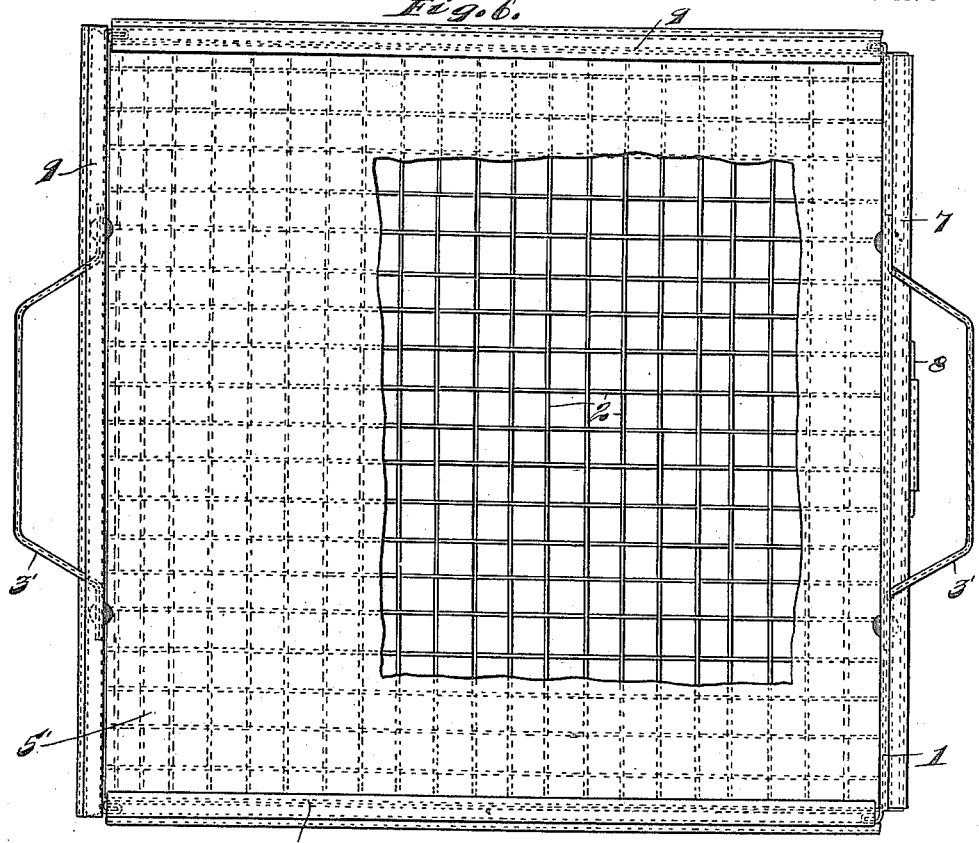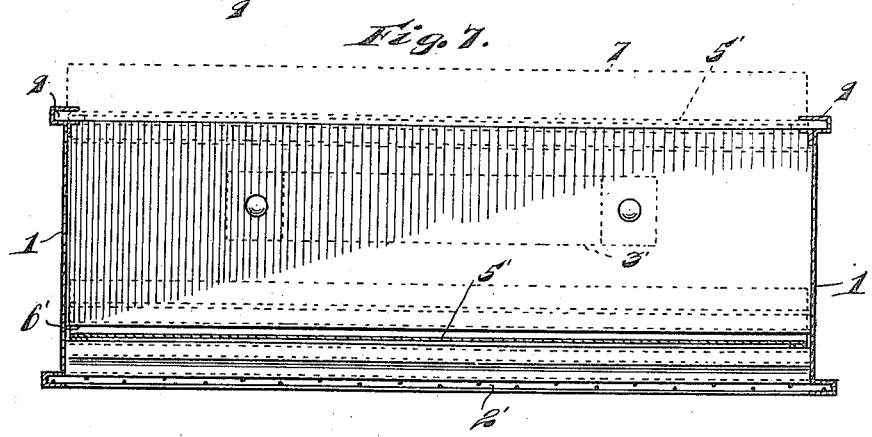

UNITED STATES PATENT OFFICE.

MORRIS B. FRANK, OF CHICAGO, ILLINOIS.

COMBINED ASH PAN AND SIFTER.

1,260,359.  Specification of Letters Patent.  Patented Mar. 26, 1918.

Application filed April 8, 1916. Serial No. 89,956.

*To all whom it may concern:*

Be it known that I, MORRIS B. FRANK, a citizen of the United States, and a resident of the city of Chicago, county of Cook, and State of Illinois, have invented a certain new and useful Combined Ash Pan and Sifter, of which the following is a specification.

My invention relates to a combined ash pan and sifter and has for its object the production of a device of this character which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a vertical longitudinal section of an ash pan embodying one form of the invention, Fig. 2 is a top plan view of Fig. 1, a portion being broken away in order to expose underlying parts, Fig. 3 is a transverse section of Fig. 1, Fig. 4 is a view similar to Fig. 1, of another form of the invention, Fig. 5 is a view similar to Fig. 4, showing the removable plate of the device in position to close the upper end of the receptacle, Fig. 6 is a view similar to Fig. 2, illustrating the form shown in Figs. 4 and 5, and Fig. 7 is a vertical transverse section of Fig. 4.

The form of the construction, as illustrated in Figs. 1, 2 and 3 of the drawings, comprises a rectangular receptacle or body 1 formed of sheet metal. Said receptacle is provided with a perforated bottom 2, a handle 3 provided at one end and a bail 4 provided at the upper end thereof. Slidably mounted in the lower portion of the receptacle is an imperforate metallic plate 5, one side of said receptacle being provided with a narrow horizontal opening 6 adjacent the lower edge thereof to permit of sliding of the plate 5 into and out of position in the receptacle. The outer end of plate 5 is provided with an up-turned flange 7, and at the upper edge of the latter is provided a pivoted handle 8.

It is of course apparent that when the plate 5 is positioned in the lower end of the receptacle, as shown in the several views, the bottom of the receptacle will be tightly closed, adapting the same for use as an ordinary ash pan. When it is desired to sift the contents of the pan, it is only necessary to remove the plate 5 through sliding of the same outwardly. Upon removal, said plate is arranged in the upper end of the receptacle with the inner edge thereof resting upon the corresponding edge of the receptacle, as shown in dotted lines in Fig. 1. The opposite end of said plate extends into the receptacle so that the flange 7 rests against the inner side of the front wall of the pan. The handle 8 is then swung forwardly and downwardly over said wall and into engagement with the front side thereof, thus serving as a means of securely locking the plate against relative shifting. The bail 4 may be rocked downwardly into engagement with the first mentioned end of said plate serving to hold the same against vertical movement. In this position of the plate it is of course apparent that the upper end of the receptacle is tightly closed so as to prevent escape of dust during the sifting operation.

In the form shown in Figs. 4 to 7 inclusive, the receptacle 1 is provided with a reticulate or wire mesh bottom 2', and said receptacle is provided at opposite sides with handles 3'. In this form the removable plate 5' also enters an opening 6' provided in the front side of the receptacle, being adapted to rest against the upper side of the bottom of said receptacle when the latter is used as a pan, in precisely the same manner as above described. In this form, however, the upper end of the receptacle is formed with guide flanges 9 adapted for engagement with the edges of the plate upon removal of the latter from the lower end of the receptacle and permit arrangement of the same in the upper end of the receptacle. Either form is adapted to perform the functions above described. The device is of simple and economical construction and hence may be manufactured at a low cost and is adapted for effective use for the purpose for which the same is designed.

While I have illustrated and described the preferred forms of construction for carrying my invention into effect, these are capable of variation and modification without departing from the spirit of the invention. I, therefore, do not wish to be limited to the precise details of constructions set forth, but desire to avail myself of such variations and modifications as come within the scope of the appended claims.

Having described my invention what I claim as new and desire to secure by Letters Patent is:

1. A device of the class described comprising a receptacle having an open upper side and a foraminated bottom; an imperforate plate adapted for removable mounting in the lower portion of said receptacle to close the bottom thereof or for engagement against the upper edge of said receptacle to close the upper end thereof; an upwardly extending flange at the front end of said plate adapted, upon arrangement of said plate at the upper end of the receptacle, to engage behind the front wall of the receptacle; and a member on said flange adapted to engage over the upper edge of said wall and against the front side thereof to lock said plate against relative shifting, substantially as described.

2. A device of the class described comprising a receptacle having an open upper side and a foraminated bottom; an imperforate plate adapted for removable mounting in the lower portion of said receptacle to close the bottom thereof or for engagement against the upper edge of said receptacle to close the upper end thereof; an upwardly extending flange at the front end of said plate adapted, upon arrangement of said plate at the upper end of the receptacle, to engage behind the front wall of the receptacle; and a pivoted handle on said flange adapted to engage over the upper edge of said wall and against the front side thereof to lock said plate against relative shifting, substantially as described.

In testimony whereof I have signed my name to this specification in the presence of two subscribing witnesses.

MORRIS B. FRANK.

Witnesses:
JOSHUA R. H. POTTS,
HELEN F. LILLIS.

Copies of this patent may be obtained for five cents each, by addressing the "Commissioner of Patents, Washington, D. C."